(12) United States Patent
Zheng

(10) Patent No.: US 7,889,648 B2
(45) Date of Patent: Feb. 15, 2011

(54) RESOURCE REVOKING METHOD BASED ON RESOURCE ADMISSION CONTROL SUBSYSTEM AND NETWORK DEVICE

(75) Inventor: Zhenjian Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 771 days.

(21) Appl. No.: 11/514,670

(22) Filed: Sep. 1, 2006

(65) Prior Publication Data

US 2007/0070891 A1    Mar. 29, 2007

(30) Foreign Application Priority Data

Sep. 2, 2005    (CN) .................. 2005 1 0098543

(51) Int. Cl.
*H04L 12/26* (2006.01)
(52) U.S. Cl. .................. 370/230; 370/229; 370/401; 709/226; 718/104; 726/1; 726/2
(58) Field of Classification Search .................. 370/229
See application file for complete search history.

(56) References Cited

U.S. PATENT DOCUMENTS

| 7,209,439 | B2 * | 4/2007 | Rawlins et al. .............. 370/230 |
| 2004/0264409 | A1 | 12/2004 | Lee et al. | |
| 2005/0259679 | A1 * | 11/2005 | Chowdhury et al. ........ 370/465 |

FOREIGN PATENT DOCUMENTS

| CN | 1549619 | 11/2004 |
| JP | 09-050380 A | 2/1997 |
| JP | 2000244523 | 9/2000 |
| KR | 20010046905 | 6/2001 |

OTHER PUBLICATIONS

"Draft ETSI TS 2XX XXX V<1.5.0> (May 2005) NGN Functional Architecture; Resource and Admission Control Subsystem (RACS); Release 1," European Telecommunications Standards Institute, May 2005.pp. 1-41.*

(Continued)

*Primary Examiner*—Ayaz R Sheikh
*Assistant Examiner*—Nicholas Sloms
(74) *Attorney, Agent, or Firm*—Finnegan, Henderson, Farabow, Garrett & Dunner LLP

(57) ABSTRACT

A resource admission control subsystem based resource revoking method is provided. The method includes: receiving by a service-based policy decision function a Revoke Reservation notification; and when determining service resources have been allocated by border gateway function for the session, notifying, by the service-based policy decision function, the border gateway function to release and revoke the service resources allocated for the session. A network device is also provided. The network device includes: a processing unit for receiving a Revoke Reservation indication; a determining unit for determining whether it is necessary to request a border gateway function to release and revoke service resources in accordance with the Revoke Reservation indication from the processing unit; and a second notifying unit for notifying the border gateway function when the determining unit determines to request the border gateway function to release and revoke the service resources.

10 Claims, 4 Drawing Sheets

OTHER PUBLICATIONS

"NGN Functional Architecture" ETSI Standards, European Telecommunications Standards Institute, Sophia-Antipo, FR, No. V 150, May 2005.

Telecommunication; "Overview of NGN Supporting IMS", Published Aug. 25, 2005, pp. 88-92.

Nikikei Communications; Basic Technique SIP Supporting IP-based Telephone Network Facilitating Fixed and Mobile Convergence, Published Aug. 15, 2005, No. 444, pp. 78-85.

PCT International Preliminary Report on Patentability including an English translation of the Written Opinion of the International Searching Authority for International Application No. PCT/CN2006/001969, mailed Dec. 14, 2006, 4 pgs.

Office Action of the Japan Patent Office for Japanese Patent Application No. 2006-238214, mailed Feb. 23, 2010, 2 pgs., English translation attached.

First Office Action of the State Intellectual Property Office of the PRC for Application No. 200680012263.8, dated May 8, 2009, 7 pgs., English translation attached.

Second Office Action of the State Intellectual Property Office of the PRC for Application No. 200680012263.8, dated Oct. 30, 2009, 7 pgs., English translation attached.

* cited by examiner

RESOURCE REVOKING METHOD BASED ON RESOURCE ADMISSION CONTROL SUBSYSTEM AND NETWORK DEVICE

CROSS REFERENCE TO RELATED APPLICATION

This non-provisional application claims priority under 35 U.S.C. 119(a) on Patent Application Serial No. 200510098543.2 filed in China on Sep. 2, 2005, the entire contents of which are hereby incorporated by reference.

FIELD OF THE INVENTION

The present invention relates to communication technology field, and particularly to a resource revoking method based on Resource Admission Control Subsystem (RACS) and a network device

BACKGROUND OF THE INVENTION

As the Internet expands, diverse network services and advanced multimedia communication systems emerge quickly. Due to the fact that real-time services are sensitive to features such as network transmission delay and time jitter, such services will be affected severely when there is any outburst of File Transfer Protocol (FTP) or Hyper Text Transfer Protocol (HTTP) service involving image files. In addition, it is difficult to reliably transmit key services that must be assured through the existing network since multimedia services occupy bandwidth heavily. Therefore, diverse Quality of Service (QoS) techniques emerge as the times require. Internet Engineering Task Force (IETF) has proposed many service models and mechanisms to meet the demand for QoS.

A wide range of portal-based applications and services as well as broadband multimedia services have become an important content in broadband operation, including providing rich Video/Audio streams, Video on Demand (VOD), video multicasting, multimedia interaction, and network games with high bandwidth requirements for common residential users, providing videoconference, remote education, Virtual Private Networks (VPNs), QoS assured data private lines, and IP Hotels, etc., for commercial users.

Operators and enterprise users have high acknowledgement to Ethernet technique and end-to-end Ethernet technique. Ethernet technique has become one of the major techniques in construction of unified networks and Metropolitan Area Networks (MANs), and Ethernet services have a good prospect in the future market. In view of the above situation, in the packet-based network architecture (i.e., Next Generation Network (NGN)) proposed in Telecommunications and Internet converged Services and Protocols for Advanced Networking (TISPAN) by European Telecommunications Standards Institute (ETSI), a Resource Admission Control Subsystem (RACS) is introduced between application layer and transport layer to manage resources in the bearer network centrally; in addition, policy-based control is provided, so that QoS of the bearer network and Network Address Translation (NAT), etc., are accessed and controlled via RACS.

The RACS architecture defined in TISPAN is shown in FIG. 1. Wherein, the RACS mainly includes: an Application Function (AF) 110, a Service-based Policy Decision Function (SPDF) 120, a Border Gateway Function (BGF) 130, an Access-Resource and Admission Control Function (A-RACF) 140, and a Resource Control Enforcement Function (RCEF) 150. The relationship and interfaces between respective functions in the RACS are also shown in FIG. 1.

Wherein, the control of Network Address and Port Translation (NAPT) is mainly performed by means of interaction among AF 110, SPDF 120, and BGF 130; the A-RACF 140 and RCEF 150 are mainly used for control of QoS resources on access layer.

In the foresaid RACS architecture, relevant resources have to be revoked once a bearer path is released or an installed policy has become invalid. The resource revoke process can be initiated by a Network Attachment Subsystem (NASS) or RCEF in the prior art.

Referring to FIG. 2, the main process of initiating a resource revoking by NASS in the prior art is as follows:

(201) the NASS decides to release a bearer path, e.g., the customer premise equipment requests the NASS to release the bearer path.

(202) The NASS notifies an A-RACF to remove the access information by sending an IP-Connectivity-Release-Indication to notify the A-RACF that the access network information has become invalid.

(203) The A-RACF requests to revoke all relevant resources by sending a Revoke Reservation request to notify an SPDF to revoke resource reservation.

(204) An SPDF notifies an AF to revoke resource reservation by sending a Revoke Reservation request.

(205) The A-RACF checks whether to revoke the policy installed for an RCEF; if so (i.e., the policy has been installed for RCEF), it executes step (206); otherwise it terminates the process.

(206) The A-RACF notifies the RCEF to revoke the policy by sending an RCEF Service Resource Release request.

(207) The RCEF revokes the policy, and returns the result by sending an RCEF Service Resource Release Acknowledgement.

Referring to FIG. 3, the main process of initiating resource revoke by RCEF in the prior art is as follows:

(301) the RCEF determines an installed policy has become invalid (e.g., due to an internal failure).

(302) The RCEF notifies A-RACF that the policy has become invalid with an Event Notify event.

(303) The A-RACF requests to revoke all relevant resources by sending a Revoke Reservation request to the SPDF to notify SPDF to revoke resource reservation.

(304) The SPDF notifies the AF to revoke resource reservation by sending a Revoke Reservation request.

According to the above two resource revoke processes: in the prior RACS architecture, if a call has requested BGF for service resources (e.g., NAT) but NASS or RCEF initiates resource revoke for some reason, the service resources allocated by BGF will not be revoked, resulting in waste of network resources.

SUMMARY OF THE INVENTION

An embodiment of the present invention aims to provide a resource revoking method based on resource admission control subsystem, including:

receiving by a service-based policy decision function a Revoke Reservation notification; and when determining service resources have been allocated by border gateway function for the session, notifying, by the service-based policy decision function, the border gateway function to release and revoke the service resources allocated for the session.

The method further includes: returning the execution result from the border gateway function to the service-based policy decision function.

Whether service resources have been allocated by border gateway function for the session is performed in accordance with a context that was created when the application function requested for resources and was contained in the notification.

Whether service resources have been allocated by border gateway function for the session is performed in accordance with information that was created and recorded in the service-based policy decision function when application function requested for resources.

The information created when application function requested for resources is identification information of the border gateway function.

The Revoke Reservation notification comes from an access-resource and admission control function.

The method further includes: checking, by the access-resource and admission control function, whether it is necessary to revoke a policy installed for a resource control enforcement function, and notifying the resource control enforcement function to revoke the policy if it is necessary.

The method further includes: returning the execution result from the resource control enforcement function to the access-resource and admission control function.

Before the service-based policy decision function receives the Revoke Reservation notification, the method further includes: triggering an event associated with the Revoke Reservation by a network attachment subsystem or the resource control enforcement function.

After the service-based policy decision function receives the Revoke Reservation notification, the method further includes: notifying the application function to revoke resource reservation by the service-based policy decision function.

Another embodiment of the present invention aims to provide a network device, including:

a processing unit for receiving a Revoke Reservation indication;

a determining unit for determining whether it is necessary to request a border gateway function to release and revoke service resources in accordance with the Revoke Reservation indication from the processing unit; and a second notifying unit for notifying the border gateway function when the determining unit determines to request the border gateway function to release and revoke the service resources.

The determining unit includes:

a context parsing unit for parsing the context in the Revoke Reservation notification from an access-resource, wherein the context was created when an application function requested for resources;

a judging unit for determining whether the border gateway function has allocated service resources for a session in accordance with the result from the context parsing unit.

The determining unit includes:

a record information searching unit for searching for the information created and recorded locally when the application function requested for resources;

a judging unit for detecting whether the border gateway function has allocated service resources for the session in accordance with the searching result from the record information searching unit.

The network device further includes: a first notifying unit for notifying the application function to revoke resource reservation in accordance with the Revoke Reservation indication.

In the RACS architecture provided in the invention, BGF can be notified in time to revoke the service resources when SPDF receives a Revoke Reservation indication. Therefore, the present invention eliminates the disadvantage that BGF is not notified to release the service resources after a session service has requested for resources from BGF and thereby the resources can't be revoked in time in the prior art. As a result, the present invention can improve utilization ratio of resources rationally.

DETAILED DESCRIPTION OF THE EMBODIMENTS

In order to enable a BGF that has allocated service resources for a session to revoke the service resources timely when a Network Attachment Subsystem (NASS) or a Resource Control Enforcement Function (RCEF) triggers an event related to resource reservation revoke, a Service-based Policy Decision Function (SPDF) determines whether the BGF has allocated service resources for the session, and, when determining the BGF has allocated service resources for the session, notifies the BGF to release and revoke the service resources.

An A-RACF sends to the SPDF a notification message containing a context related to the resources; the context was created when AF requests SPDF for resources, and was stored in AF and A-RACF, etc. When the SPDF selects a BGF to allocate service resources according to the policy, corresponding information is recorded in the context. Therefore, if the A-RACF sends a Revoke Reservation request message containing BGF information, the SPDF can determine whether BGF has allocated service resources for the session in accordance with corresponding information in the context.

In addition, when the AF requests for resources, the SPDF can record the BGF information locally after it selects BGF to allocate resources; in this way, it is unnecessary to contain BGF information in the Revoke Reservation request message from the A-RACF, while the SPDF determine whether the BGF has allocated service resources for the session directly in accordance with the records recorded locally.

Figure 1:
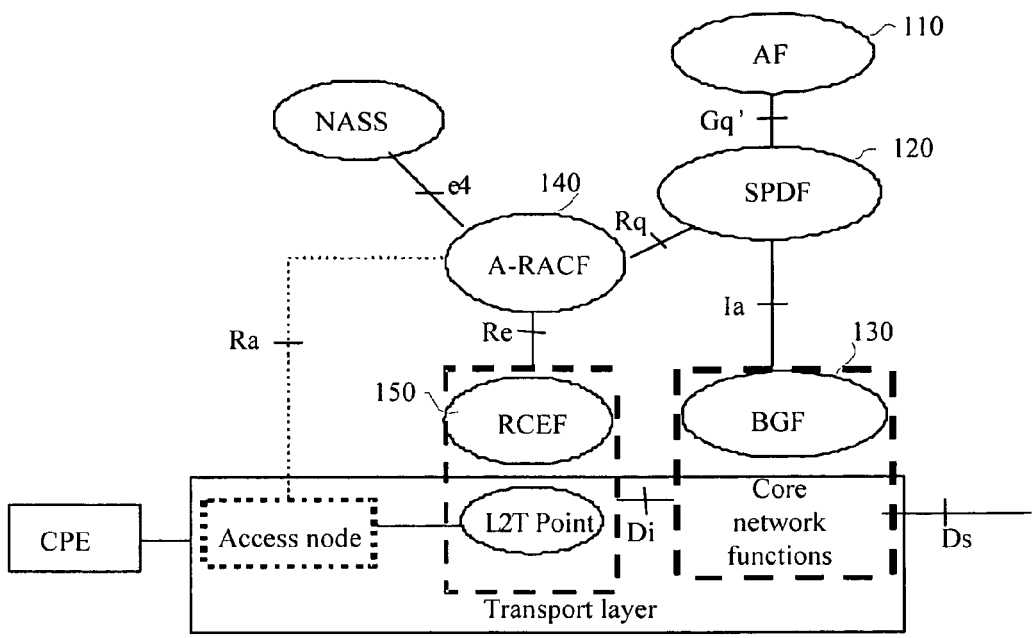
FIG. 1 is a schematic diagram of the RACS architecture in the prior art.
Figure 2:
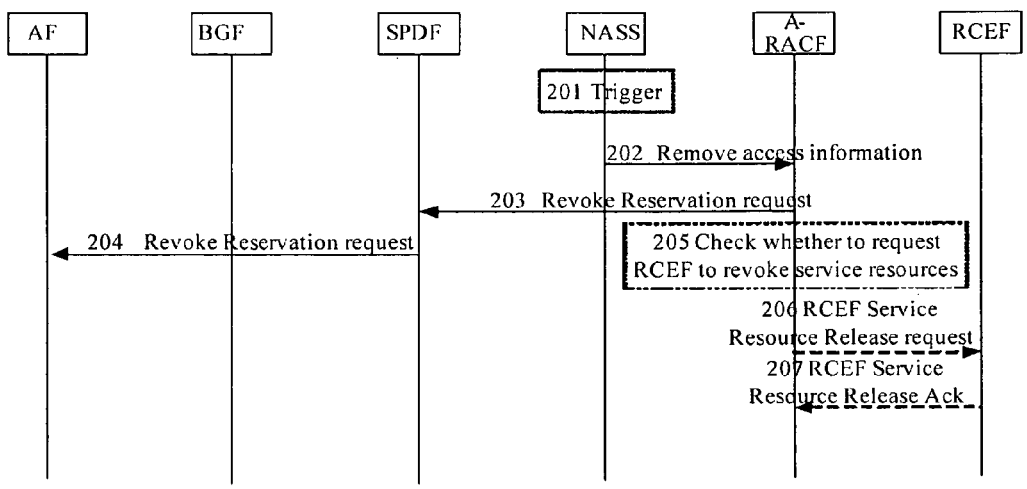
FIG. 2 is a processing flow diagram of initiating a resource revoke by NASS in the prior art.
Figure 3:
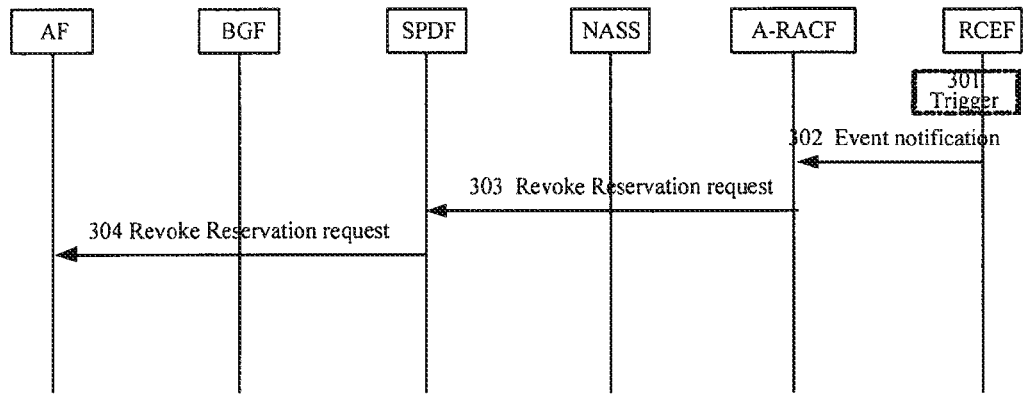
FIG. 3 is a processing flow diagram of initiating a resource revoke by RCEF in the prior art.
Figure 4:
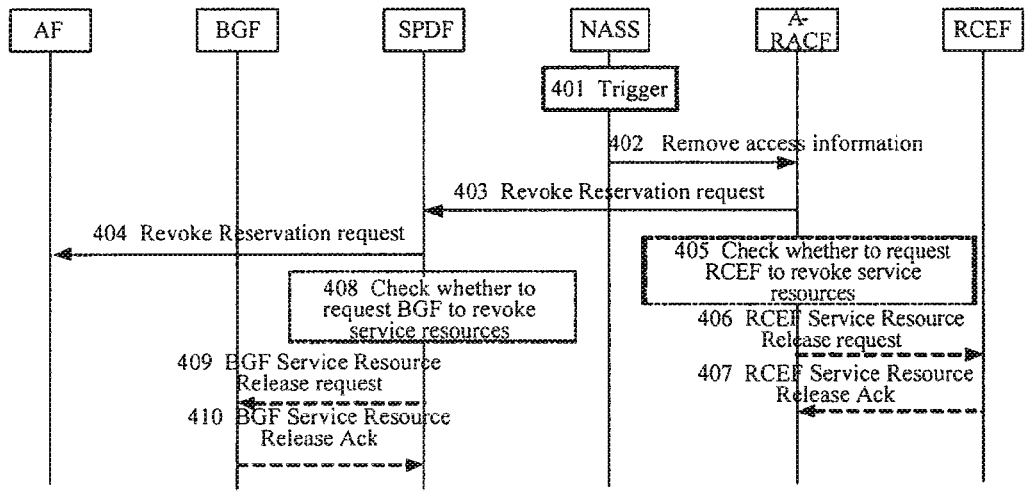
FIG. 4 is a processing flow diagram of initiating a resource revoke by NASS according to one embodiment of the present invention.

Referring to FIG. 4, the main process of initiating a resource revoke by the NASS in one embodiment of the present invention is as follows:

Step 401: an NASS decides to release a bearer path, e.g., the customer premise equipment requests the NASS to release the bearer path.

Step 402: the NASS sends an IP-Connectivity-Release-Indication to an A-RACF, to notify the A-RACF that the access network information has become invalid.

Step 403: the A-RACF will revoke all corresponding resources allocated for a corresponding session by sending SPDF a Revoke Reservation request message containing corresponding context information.

Step 404: the SPDF sends a Revoke Reservation request message to AF for the session.

Step 405: the A-RACF checks whether to revoke the policy installed for RCEF; if so, the process goes to step 408 after steps 406 and 407; otherwise the process goes to step 408 directly.

There are many ways to perform the checking; for example, when requesting for resources, the A-RACF determines whether to request RCEF for service resources in accordance with local policy and subscriber access information from NASS, and chooses a RCEF to request for service resources as required and records the information of the RCEF entity locally; in this way, when the A-RACF is to release service resources, it can determine whether to notify the RCEF to revoke the policy in accordance with the information of the RCEF entity recorded locally.

Step 406: the A-RACF notifies RCEF to revoke the policy.

Step 407: the RCEF revokes the policy and returns the result to the A-RACF.

Step 408: the SPDF checks whether to request BGF to release the service resources (i.e., whether the BGF has allocated service resources for the session) in accordance with the information in the context. If so, the process goes to step 409; otherwise it terminates the processing flow of resource revoking.

Step 409: the SPDF sends a Service Resource Release request to the BGF, to request BGF to release the service resources allocated for the session.

Step 410: the BGF revokes the resources and returns an Acknowledgement message to the SPDF, to inform SPDF of the execution result.

Figure 5:
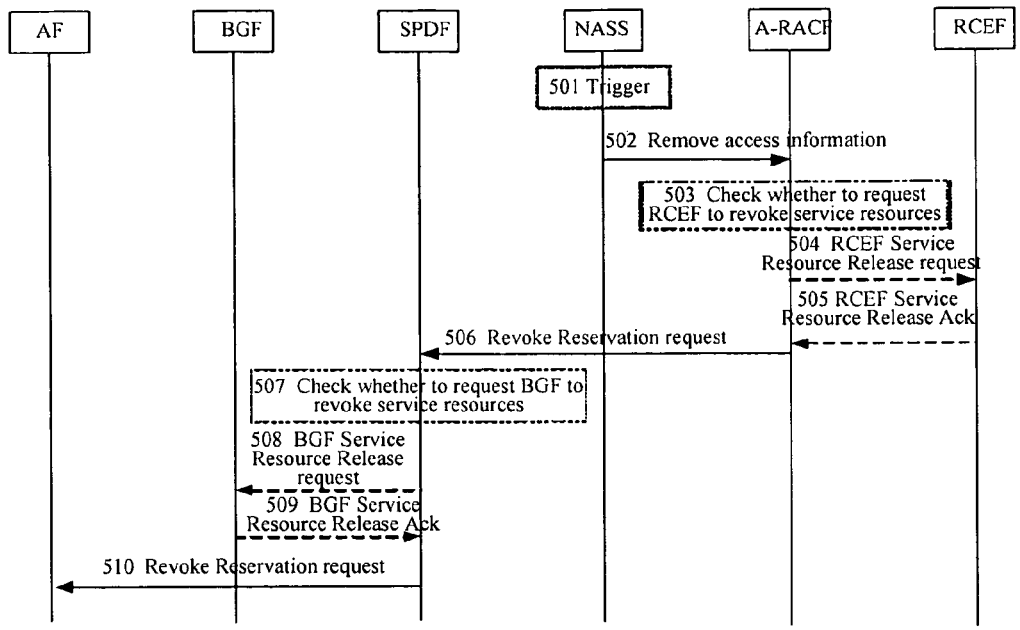
FIG. 5 is a processing flow diagram of initiating a resource revoke by NASS according to another embodiment of the present invention.

In another embodiment of the present invention, the process of initiating resource revoke by NASS is not limited to above process; it can also be the process shown in FIG. 5, i.e., step 507 (determination of BGF) is executed first, and then step 510 (notify AF) is executed. That is, the sequence of checking BGF and notifying AF doesn't affect the implementation of the present invention; however, a common step is: the SPDF further determine whether to request BGF to release service resources.

Furthermore, the sequence of checking whether to revoke the policy installed for the RCEF (step 405 or 503) and determining BGF (step 408 or 507) by A-RACF doesn't affect the implementation of the present invention, which is not described here in detail.

Figure 6:
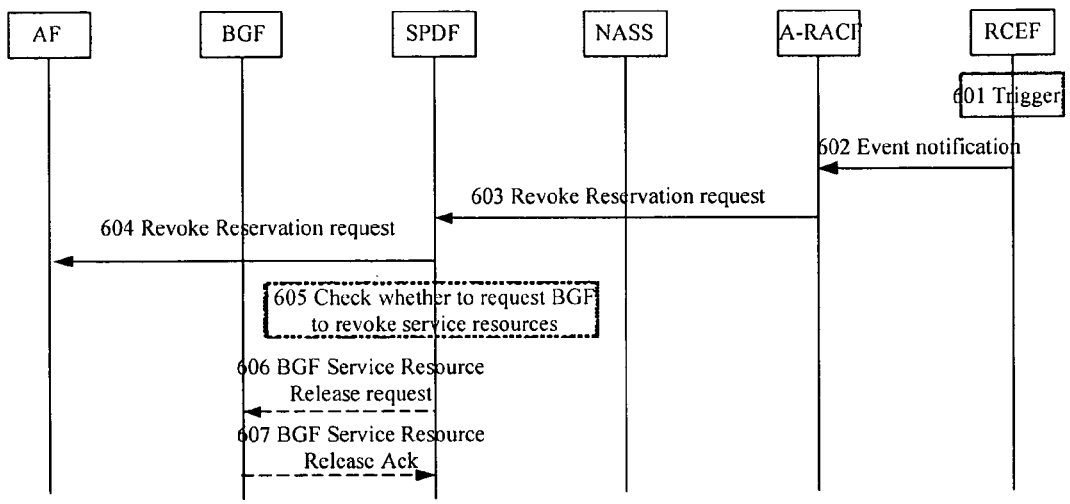
FIG. 6 is a processing flow diagram of initiating a resource revoke by RCEF according to one embodiment of the present invention.

Referring to FIG. 6, the main process of initiating a resource revoke by the RCEF in one embodiment of the present invention is as follows:

Step 601: the RCEF determines an installed policy has become invalid, e.g., due to an internal failure.

Step 602: the RCEF notifies an A-RACF that the policy has become invalid with an Event Notify event.

Step 603: the A-RACF will revoke all corresponding resources by sending SPDF a first Revoke Reservation Request containing corresponding context information.

Step 604: the SPDF sends a second Revoke Reservation Request to the AF.

Step 605: the SPDF determines whether to request BGF to release the service resources; if so, the process goes to step 606; otherwise it terminates the process of resource revoking.

Step 606: the SPDF sends a Release Service Resource request message to the BGF.

Step 607: the BGF revokes the resources and returns an Acknowledgement message to the SPDF, to inform SPDF of the execution result.

Figure 7:
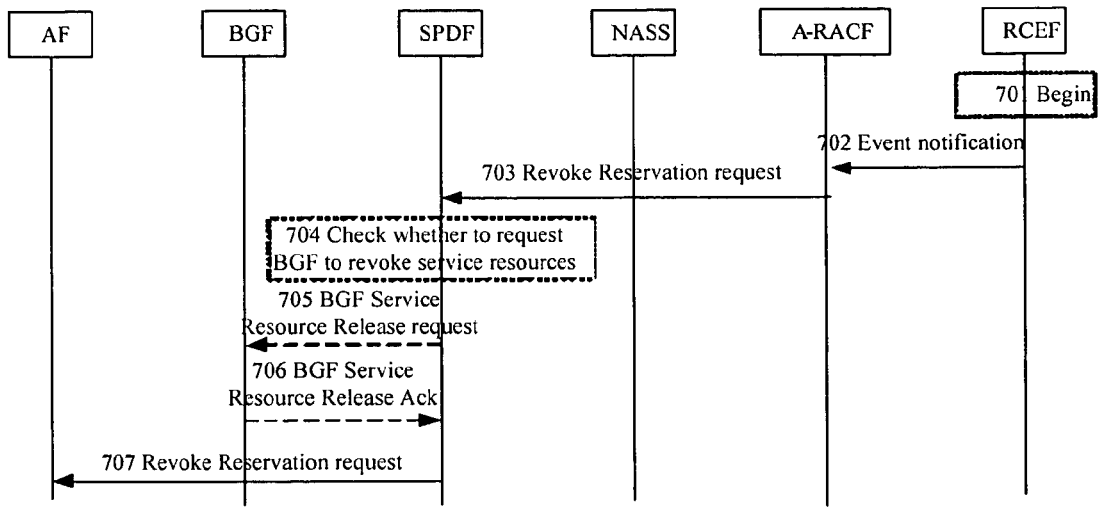
FIG. 7 is a processing flow diagram of initiating a resource revoke by RCEF according to another embodiment of the present invention.

In another embodiment of the present invention, the process of initiating resource revoke by RCEF is not limited to above process; it can also be the process shown in FIG. 7, i.e., step 704 (determination of BGF) is executed first, and then step 707 (notify AF) is executed. That is, the sequence of determining BGF and notifying AF doesn't affect the implementation of the present invention; however, a common process is: the SPDF further determine whether to request BGF to release the service resources.

Figure 8:
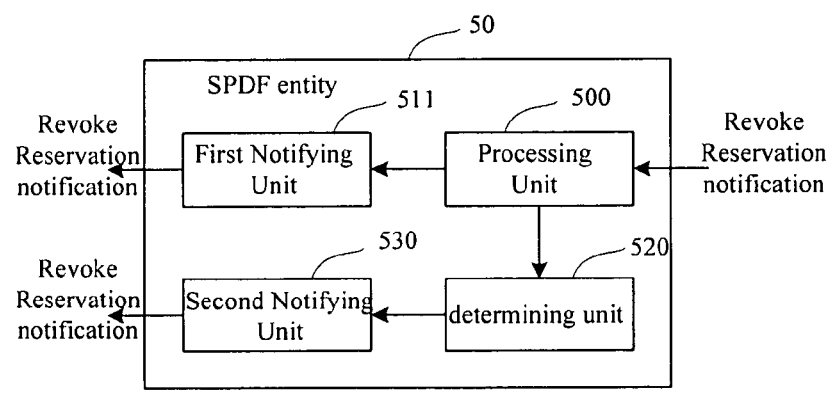
FIG. 8 is a block diagram of a device provided in an embodiment of the present invention.

Referring to FIG. 8. in a device according to an embodiment of the present invention, the SPDF 50 includes a processing unit 500, a first notifying unit 511, a determining unit 520, and a second notifying unit 530; wherein:

The processing unit 500 is used to receive Revoke Reservation requests and accomplish all other process required for fundamental functions in the prior art;

The first notifying unit 511 is coupled with the processing unit 500 logically, and is used to notify an AF to revoke resource reservation as indicated in a first Revoke Reservation indication;

The determining unit 520 is coupled with the processing unit 500 logically, and is used to determine whether to request a BGF to release and revoke the service resources as indicated in a second Revoke Reservation indication triggered by NASS or RCEF;

The second notifying unit 530 is coupled with the processing unit 500 logically, and is used to notify BGF when the determining unit 520 determines to request BGF to release and revoke the service resources.

In the functional structure of SPDF in above embodiment, the second notifying unit 530 can be contained in the first notifying unit 511, i.e., the two notifying units are in an integral structure.

In another embodiment of the present invention, the SPDF can be a separate physical device, or a logical function entity included in another physical device.

Wherein, in an embodiment, the determining unit 520 includes a context parsing unit and a judging unit; the context parsing unit is used to parse the context that is created when AF requested for resources and is contained in the Revoke Reservation notification from A-RACF; the judging unit is used to determine whether the BGF has allocated service resources for the session in accordance with the parsing result.

In another embodiment of the present invention, the determining unit 520 includes a record information searching unit and a judging unit; the record information searching unit is used to search for the information created and recorded locally when AF requests for resources; the judging unit is used to detect whether the BGF has allocated service resources for the session in accordance with the searching result.

It is apparent that those skilled in the art can make various modifications and variations to the present invention, without departing from the spirit and scope of the present invention. However, any of such modifications and variations shall fall into the protective scope of the present invention, if such modifications and variations are within the scope defined in the claims or an equivalent technical scope.

What is claimed is:

1. A resource revoking method based on a resource admission control subsystem, comprising:

when a service-based policy decision function selects a border gateway function to allocate service resources according to a policy, recording corresponding information including border gateway function information in a context related to resources at an access-resource and admission control function;

receiving, by a service-based policy decision function, a Revoke Reservation notification containing the context including the border gateway function information related to resources from the access-resource and admission control function, parsing the context in the Revoke Reservation notification;

determining, by the service-based policy decision function, whether service resources have been allocated by a border gateway function for a session in accordance with the context parsed from the Revoke Reservation notification; and if determining that the service resources have been allocated by the border gateway function for the session in accordance with the context including border gateway function information, notifying, by the service-based policy decision function, the border gateway function to release and revoke the service resources allocated for the session;

if determining that the service resources have not been allocated by the border gateway function for the session in accordance with the context including border gateway function information, terminating, by the service-based policy decision function, the processing flow of resource revoking.

2. The method according to claim 1, further comprising the step of: receiving by the service-based policy decision function an execution result returned from the border gateway function to the service-based policy decision function.

3. The method according to claim 1, further comprising: checking, by the access-resource and admission control function, whether it is necessary to revoke a policy installed for a resource control enforcement function, and notifying the resource control enforcement function to revoke the policy if it is necessary; and returning the execution result from the resource control enforcement function to the access-resource and admission control function.

4. The method according to claim 1, before the service-based policy decision function receives the Revoke Reservation notification, further comprising:
triggering an event associated with Revoke Reservation by a network attachment subsystem or a resource control enforcement function.

5. The method according to claim 1, after the service-based policy decision function receives the Revoke Reservation notification, further comprising: notifying an application function to revoke resource reservation by the service-based policy decision function.

6. A resource revoking method based on resource admission control subsystem, comprising:
receiving by a service-based policy decision function a Revoke Reservation notification from an access-resource and admission control function;

after receiving the Revoke Reservation notification from the access-resource and admission control function, determining, by the service-based policy decision function, whether service resources have been allocated by a border gateway function for a session by searching for identification information of the border gateway function that is recorded in the service-based policy decision function and that is created when an application function requests for resources and the service-based policy decision function select the border gateway function to allocate resources; and if determining that the service resources have been allocated by the border gateway function for the session, notifying, by the service-based policy decision function, the border gateway function to release and revoke the service resources allocated for the session;

if determining that the service resources have not been allocated by the border gateway function for the session, terminating, by the service-based policy decision function, the processing flow of resource revoking.

7. The method according to claim 6, further comprising the step of:
receiving by the service-based policy decision function the execution result returned from the border gateway function.

8. The method according to claim 6, further comprising: checking, by the access-resource and admission control function, whether it is necessary to revoke a policy installed for a resource control enforcement function, and notifying the resource control enforcement function to revoke the policy if it is necessary; and returning the execution result from the resource control enforcement function to the access-resource and admission control function.

9. The method according to claim 6, before the service-based policy decision function receives the Revoke Reservation notification, further comprising: triggering an event associated with Revoke Reservation by a network attachment subsystem or a resource control enforcement function.

10. The method according to claims 6, after the service-based policy decision function receives the Revoke Reservation notification, further comprising: notifying the application function to revoke resource reservation by the service-based policy decision function.

* * * * *